United States Patent
Sun et al.

(10) Patent No.: US 7,090,810 B2
(45) Date of Patent: Aug. 15, 2006

(54) SELECTIVE CATALYTIC REDUCTION OF NOX ENABLED BY SIDESTREAM UREA DECOMPOSITION

(75) Inventors: William H. Sun, Lisle, IL (US); William E. Cummings, Jr., Easton, CT (US); Piers de Havilland, Ticino (IT); Paul G. Carmignani, Naperville, IL (US); John M. Boyle, Oak Park, IL (US)

(73) Assignee: Fuel Tech Inc., Batavia, IL (US)

(*) Notice: Subject to any disclaimer, the term of this patent is extended or adjusted under 35 U.S.C. 154(b) by 360 days.

(21) Appl. No.: 10/031,724

(22) PCT Filed: Dec. 3, 2001

(86) PCT No.: PCT/US01/46415

§ 371 (c)(1),
(2), (4) Date: Jul. 3, 2003

(87) PCT Pub. No.: WO02/43837

PCT Pub. Date: Jun. 6, 2002

(65) Prior Publication Data

US 2004/0057887 A1    Mar. 25, 2004

Related U.S. Application Data

(60) Provisional application No. 60/250,618, filed on Dec. 1, 2000.

(51) Int. Cl.
  *C01B 21/00* (2006.01)
(52) U.S. Cl. ........................................ 423/235
(58) Field of Classification Search ................ 60/39.5, 60/39.52; 423/235–239.1
  See application file for complete search history.

(56) References Cited

U.S. PATENT DOCUMENTS

| | | | |
|---|---|---|---|
| 3,032,287 A | 5/1962 | Holger et al. | 23/2 |
| 3,599,427 A | 8/1971 | Jones | 60/30 |

(Continued)

FOREIGN PATENT DOCUMENTS

| | | |
|---|---|---|
| CA | 1100292 | 5/1981 |
| DE | 199 13 462 A | 9/2000 |

(Continued)

OTHER PUBLICATIONS

Hultermans, R.J., "Selective Catalytic Reduction of NOx from Diesel Engine Exhaust Using Injection of Urea", Ph.D. Thesis, University of Delft, Sep. 1995.

*Primary Examiner*—Collen P. Cooke
(74) *Attorney, Agent, or Firm*—Thaddius J. Carvis (57) ABSTRACT

A preferred process arrangement utilizes the enthalpy of the flue gas, which can be supplemented if need be, to convert urea (30) into ammonia for SCR. Urea (30), which decomposes at temperatures above 140° C., is injected (32) into a flue gas stream split off (28) after a heat exchanger (22), such as a primary superheater or an economizer. Ideally, the side stream would gasify the urea without need for further heating; but, when heat is required it is far less than would be needed to heat either the entire effluent (23) or the urea (30). This side stream, typically less than 3% of the flue gas, provides the required temperature and residence time for complete decomposition of urea (30). A cyclonic separator can be used to remove particulates and completely mix the reagent and flue gas. This stream can then be directed to an injection grid (37) ahead of SCR using a blower (36). The mixing with the flue gas is facilitated due to an order of magnitude higher mass of side stream compared to that injected through the AIG in a traditional ammonia-SCR process.

15 Claims, 11 Drawing Sheets

U.S. PATENT DOCUMENTS

| | | | |
|---|---|---|---|
| 3,900,554 A | 8/1975 | Lyon | 423/235 |
| 4,107,272 A | 8/1978 | Mori et al. | 423/239 |
| 4,138,469 A | 2/1979 | Kato et al. | 423/239 |
| 4,160,009 A | 7/1979 | Hamabe | 422/108 |
| 4,208,386 A | 6/1980 | Arand et al. | 423/239 |
| 4,268,488 A | 5/1981 | Ginger | 423/239 |
| 4,325,924 A | 4/1982 | Arand et al. | 423/235 |
| 4,393,031 A | 7/1983 | Henke | 423/239 |
| 4,533,364 A | 8/1985 | Altman et al. | 55/5 |
| 4,767,605 A | 8/1988 | Lindbauer et al. | 423/239 |
| 4,925,640 A | 5/1990 | Morii et al. | 423/239 |
| 5,252,298 A | 10/1993 | Jones | 422/172 |
| 5,282,355 A * | 2/1994 | Yamaguchi | 60/39.5 |
| 5,294,409 A * | 3/1994 | Cohen et al. | 422/169 |
| 5,300,270 A * | 4/1994 | Krigmont et al. | 423/239.1 |
| 5,431,893 A | 7/1995 | Hug et al. | 423/239.1 |
| 5,601,792 A | 2/1997 | Hug et al. | 422/169 |
| 5,943,865 A | 8/1999 | Cohen | 60/653 |
| 5,985,224 A | 11/1999 | Lagana | 423/235 |
| 5,988,115 A | 11/1999 | Anderson et al. | 122/4 D |
| 6,063,350 A * | 5/2000 | Tarabulski et al. | 423/239.1 |
| 6,077,491 A * | 6/2000 | Cooper et al. | 423/235 |
| 6,093,380 A | 7/2000 | Lagana et al. | 423/239.1 |
| 6,146,605 A * | 11/2000 | Spokoyny | 423/239.1 |
| 6,203,770 B1 * | 3/2001 | Peter-Hoblyn et al. | 423/212 |
| 6,266,953 B1 * | 7/2001 | Ramstetter et al. | 60/783 |

FOREIGN PATENT DOCUMENTS

| | | |
|---|---|---|
| EP | 0 210 392 | 2/1987 |
| EP | 0 363 684 A | 4/1990 |
| EP | 0 487 886 A1 | 10/1991 |
| EP | 0 615 777 A1 | 9/1994 |
| JP | 401022328 | 1/1989 |
| WO | 97/01387 | 1/1997 |
| WO | WO 98/22209 | 5/1998 |

* cited by examiner

SELECTIVE CATALYTIC REDUCTION OF NOX ENABLED BY SIDESTREAM UREA DECOMPOSITION

This application claims the benefit of Provisional Application No. 60/250,618, filed Dec. 1, 2000.

BACKGROUND OF THE INVENTION

The invention concerns a new selective catalytic reduction of $NO_x$, which is enabled by a side gas stream that can be separated from the main stream, or a side stream of hot air to provide for decomposition of the urea into its active components including ammonia.

Efforts are being made in many jurisdictions to reduce the emissions of nitrogen oxides ($NO_x$). The technologies have included those that modify the combustion conditions and fuels, known as primary measures, and those that treat the exhaust after combustion, known as secondary measures. When effective primary measures are employed, the secondary measures can still be employed to achieve further reductions. To provide the best $NO_x$ reduction, it is apparent that both primary and secondary measures will be necessary.

Among the known secondary measures are selective catalytic reduction (SCR) and selective noncatalytic reduction (SNCR). Both have been conducted with both ammonia and urea. See, for example U.S. Pat. No. 3,900,554, wherein Lyon discloses SNCR of nitrogen monoxide (NO) in a combustion effluent by injecting ammonia, specified ammonia precursors or their aqueous solutions into the effluent for mixing with the nitrogen monoxide at a temperature within the range of 1600° F. to 2000° F. Lyon also suggests the use of reducing agents, such as hydrogen or various hydrocarbons, to permit the effective use of ammonia at effluent temperatures as low as 1300° F. However, these temperatures are often too high for effective treatment, ammonia is difficult to deal with safely, and SNCR is not as effective as SCR. Similar processes are taught for urea by Arand, Muzio, and Sotter, in U.S. Pat. No. 4,208,386, and Arand, Muzio, and Teixeira, in U.S. Pat. No. 4,325,924. Again the temperatures are high, and the use of lower temperatures is not enabled.

SCR can operate with ammonia at lower temperatures, generally within the range of from 100° to 900° F. In this regard, see U.S. Pat. Nos. 3,032,387 and 3,599,427. SCR (selective catalytic reduction) has been available for years in some contexts for reducing $NO_x$. To date, however, SCR has depended on the use of ammonia, which has safety problems associated with its storage, handling, and transport. Urea is safer, but has not been practical for many SCR applications due to the difficulty in converting it from a solid or an aqueous form to its active gaseous species that are reactive on catalyst bed for NOx reduction. Also, the reagent economics typically favor anhydrous ammonia over urea. In "A Selective Catalytic Reduction Of $NO_x$ from Diesel Engines Using Injection Of Urea" (Ph.D. thesis, September 1995), Hultennans describes a number of technical challenges in the context of Diesel engines while giving a broad background on the technology.

The use of catalysts for $NO_x$ reduction utilizing urea is effective but is sensitive to particulates and undecomposed urea, which can foul a catalyst. In this regard, it must be remembered that temperatures at the low end of the SCR treatment temperature range will not be high enough to fully gasify the urea. In addition, SCR requires very uniform mixing of active gaseous species prior to contact with the catalyst, and it is difficult to uniformly mix urea or its decomposition products with the large amounts of effluent in need of treatment. The limited attempts to use urea SCR for stationary and mobile sources, such as diesel engines, have been described in several recent patents including U.S. Pat. No. 5,431,893, to Hug, et al. To protect the catalyst from fouling, Hug, et al., proposes bulky equipment capable of treating all effluent with urea. Regardless of physical form, urea takes time to break down in hot exhaust gases and may cause nozzle plugging at the temperatures most conducive to gasification. This disclosure highlights the problems making it a necessity that the urea solution is maintained at a temperature below 100 C to prevent hydrolysis in the injection equipment. They propose the use of moderate urea pressures when feeding the urea and find it necessary to have alternative means to introduce high-pressure air into the feed line when it becomes plugged. The nozzles employed by Hug, et al., use auxiliary air to aid dispersion. Also, they employ dilute solutions that require significant heating to simply evaporate the water. See also, WO 97/01387 and European Patent Specification 487,886 A1.

In European Patent Specification 615,777 A1, there is described an apparatus that feeds solid urea into a channel containing exhaust gases, which are said to be hydrolyzed in the presence of a catalyst. For successful operation the disclosure indicates that it is necessary to employ a hydrolysis catalyst, compressed air for dispersion of fine solids, means for grinding the urea into fine solids and a coating to prevent urea prills from sticking together. The disclosure notes that if the inside of the catalyzer and the nozzle tip only were coated with the catalyst, corrosion and deposition would occur. Despite achieving the goal of removing water from the process, the specification introduces solid urea into the gas stream—possibly depositing urea on the SCR catalyst.

In U.S. Pat. No. 6,146,605 to Spokoyny, there is described a combined SCR/SNCR process in a staged process involving a separate step of hydrolyzing the urea prior to an SCR stage. A similar process is disclosed in U.S. Pat. Nos. 5,985,224 and 6,093,380 to Lagana, et al., which describe a method and apparatus involving the hydrolysis of urea followed by a separation of a gas phase from a liquid hydrolysate phase. Also, Copper, et al., disclosed a urea hydrolysis process to generate ammonia in U.S. Pat. No. 6,077,491. In all these processes there is a requirement to handle a significant amount of high temperature and high pressure gas and liquid phases containing ammonia during and after hydrolysis. This extra processing requires the purchase and maintenance of additional equipment, an emergency plan and equipment to handle ammonia release in case of process failures, and it would be desirable to have a system which operated more safely, simply and efficiently.

The art is awaiting the development of a process and apparatus that would permit the use of urea in an SCR process simply, reliably, economically, and safely.

SUMMARY OF THE INVENTION

The invention provides a practical way to achieve uniform mixing of active gaseous reactants for $NO_x$ reduction by SCR using urea as the reagent and novel process arrangements that assure that the gases are at the proper temperature for effective $NO_x$ reduction.

The new design of the invention enables gasification of urea and thorough mixing with $NO_x$-containing combustion gases and can advantageously utilize the enthalpy of the flue gas, which can be supplemented if need be, to convert urea to SCR reagents such as ammonia. Urea, which decomposes at temperatures above 140° C., is injected into a side stream where it is gasified and mixed with other gases. In one highly effective arrangement, the side stream is a flue gas stream split off after a primary superheater or an economizer. Ideally, the side stream would decompose the urea without need for further heating; but, when heat is required, it is far less than would be needed to heat either the entire effluent. Depending on the temperature, this side stream, typically less than 3% of the flue gas, provides the required enthalpy and momentum for complete gasification of urea and thorough mixing of the reagent containing side stream into the main stream.

A mixing device, such as cyclonic separator, static mixer or blower, can more completely mix the reagent and flue gas prior to reinjection into the main stream. A cyclone separator has the advantage that it can also remove particulates that might be present. The side stream containing gasified urea can then be directed to an injection grid ahead of an SCR catalyst using a high temperature blower. Vortex mixers or other types of static mixer can be installed downstream of the injection grid to thoroughly mix the side stream and the main stream. The mixing with the flue gas is facilitated due to an order of magnitude higher mass of side stream compared to that injected through the ammonia-injection grid (AIG) in a traditional ammonia-SCR process.

This new process and the apparatus for performing it make use of the easy handling feature of urea reagent without requiring either reagent carrier air or an additional source of heat solely directed to heat and hydrolyze the urea, and the side stream gas mass provides thorough mixing required for high levels of $NO_x$ reduction.

According to one embodiment of the invention, a side stream is separated from the main effluent stream from a combustor and urea is injected into it at a temperature sufficient to fully decompose or otherwise gasify the urea to active gas species.

According to another embodiment of the invention, a side stream is separated from the main effluent stream from a combustor following final treatment and urea is injected into it at a temperature sufficient to fully gasify the urea to active gas species.

According to a further embodiment of the invention, a side stream is brought in from a source external to the combustor and urea is injected into it at a temperature sufficient to fully gasify the urea to active gas species.

According to another embodiment of the invention, a side stream is separated from the main effluent stream from a combustor, a heater is provided to raise the split stream temperature sufficiently to fully gasify the urea to active gas species and urea is injected into it wherein it is decomposed or otherwise gasified.

According to another embodiment of the invention, a side stream is separated from the main effluent stream from a combustor and urea is injected into it, with the two streams then combined and passed through a cyclone to effect complete mixing and particle separation.

In another embodiment of the invention, a side stream is separated from the main effluent stream from a combustor and is passed through a cyclone prior to heating it and injecting urea into it.

In yet another embodiment of the invention, a side stream is separated from the main effluent stream from a combustor, and the stream is heated and urea is injected into it prior to passing it through a cyclone.

An alternative embodiment of the invention, utilizes a stream of air, air preheated by a flue-gas-to-air heat exchanger, or preheated combustion air, which is further heated and combined with urea, with the resulting stream then passed through a mixer, if desired, and injection grid as it is combined with the effluent stream from a combustor and passed through an SCR reactor.

In any of these embodiments, steam can be employed to assure maximum production of ammonia and as supplemental source of heat for gasification or for maintaining the temperature of the catalyst. Also, the side stream containing active SCR reagent can be reintroduced into the main flue gas stream through a properly designed ammonia injection grid (AIG) in a traditional ammonia-SCR process in any of these embodiments. Furthermore, a blower appropriate for supplying air or flue gas at desired temperatures can be located before or after the urea injection, whichever better suited for an application, to provide sufficient pressure to reintroduce the side stream into the main flue gas stream.

Many of the preferred aspects of the invention are described below. Equivalent compositions are contemplated.

BRIEF DESCRIPTION OF THE DRAWINGS

The invention will be better understood and its advantages will become more apparent from the following detailed description, especially when taken with the accompanying drawings, wherein.

DESCRIPTION OF THE INVENTION

The invention provides a urea-based SCR process that can advantageously utilize the enthalpy of the flue gas, which can be supplemented if need be, to convert urea to ammonia. There are several embodiments which will be described in preferred forms. It is intended, however, that various features of the embodiments can be utilized in combination with embodiments other than those specifically detailing the features. Common elements and features of the drawings will have common reference numerals throughout the drawings.

This new process makes use of the easy handling feature of urea reagent and provides complete gasification and good mixing employing a side stream gas mass to provide thorough mixing required for high levels of $NO_x$ reduction. In particularly advantageous embodiments, heat necessary for gasification is derived from the enthalpy of the combustion gases.

The process is effective with urea, but can utilize other $NO_x$-reducing reagents capable of generating a reactant gas containing ammonia upon heating. As will be clear from the following, when certain of these reagents are gasified, the reactant gas will also contain HNCO which reacts with water to convert to ammonia and carbon dioxide. It is an advantage of the invention that this can be easily achieved without prehydrolysis of the $NO_x$-reducing reagent which has the attendant risk of plugging nozzles and other equipment. By the term "gasification" we mean that substantially all of the urea is converted into a gas, leaving no significant dissolved or free solids or liquid to contact with and foul SCR catalysts.

The term "urea" is meant to include the reagents that are equivalent to urea in the sense that they form ammonia and HNCO when heated, whether or not they contain large amounts of the pure chemical urea in the form introduced into the combustion gases; however, the reagents that are equivalent to urea typically contain measurable quantities of urea in their commercial forms and thus comprise urea. Among the $NO_x$-reducing reagents that can be gasified are those that comprise a member selected from the group consisting of: ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; triuret, cyanuric acid; isocyanic acid; urea formaldehyde; melamine; tricyanourea and mixtures of any number of these. Yet other $NO_x$-reducing reagents are available that do not form HNCO, but decompose to a mixture of gases including hydrocarbons. Among this group are various amines and their salts (especially their carbonates), including guanidine, guanidine carbonate, methyl amine carbonate, ethyl amine carbonate, dimethyl amine carbonate, hexamethylamine; hexamethylamine carbonate; and byproduct wastes containing urea from a chemical process. Amines with higher alkyls can be employed to the extent that the hydrocarbon components released do not interfere with the $NO_x$-reduction reaction.

The term "urea" is thus meant to encompass urea in all of its commercial and equivalent forms. Typically, commercial forms of urea will consist essentially of urea, containing 95% or more urea by weight. This relatively pure form of urea is preferred and has several advantages in the process of the invention.

It is a further advantage of the invention, that while ammonia need not be utilized at all, the apparatus described herein improves the introduction of SCR reagents including ammonia and thus makes its use more practical even though the problems with its storage will not be fully resolved.

The urea solution is introduced at a rate relative to the $NO_x$ concentration in said combined stream prior to passage through said $NO_x$-reducing catalyst effective to provide an NSR of from about 0.1 to about 2, depending on a number of factors, but more typically is within the range of from 0.5 to 1.1. The term "NSR" refers to the relative equivalents of nitrogen in the urea or other $NO_x$-reducing agent to the equivalents of nitrogen in the $NO_x$ in the combustion gases to be treated.

The term "combustor" is meant in the broad sense to include all combustors which combust carbonaceous fuels to provide heat, e.g., for direct or indirect conversion to mechanical or electrical energy. These carbonaceous fuels can include the hydrocarbons normally used as fuels as well as combustible waste materials such as municipal solid waste, industrial process waste and the like. Burners and furnaces, as well as, internal combustion engines of the Otto, Diesel and turbine types, are included within the definition of the term combustor and can benefit from the invention. However, since the problems and advantages of successful achievement of reliable $NO_x$ reduction on combustors utilizing ammonia as a reducing agent are so pronounced, the large-scale combustor is used throughout this description for purposes of example. Stationary and mobile combustors of all types are, however, contemplated. However, the current invention is not limited to combustor flue gases. Rather, any hot flue gas that can benefit from passing through an SCR reactor for NOx reduction can benefit from this invention.

Figure 1:
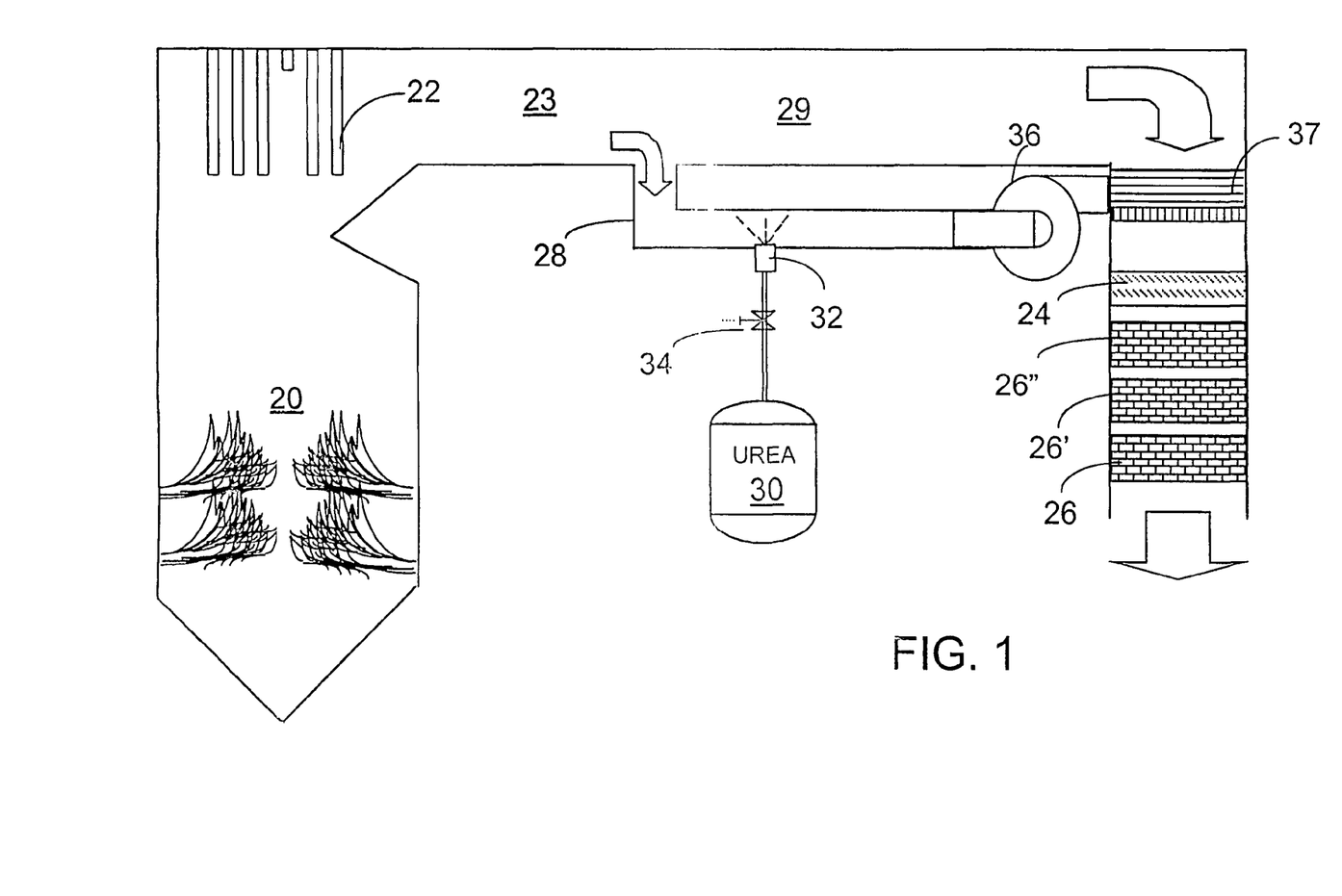
FIG. 1 is a schematic representation of one embodiment of the invention wherein a side stream is separated from the main effluent stream from a combustor and urea is injected into it at a temperature sufficient to fully decompose the urea to active gas species. A blower that can be located before or after the urea injection provides sufficient pressure to introduce the side stream into the main stream. An injection grid or a traditional ammonia injection grid is utilized to thoroughly distribute the reagent into the main stream ahead of SCR reactor.

FIG. 1 is a schematic representation of one embodiment of the invention wherein a side stream is separated from the main effluent stream from a combustor and urea is injected into it at a temperature sufficient to fully decompose or otherwise gasify the urea to active gas species. A large-scale combustor 20 burns fuel with the resulting production of nitrogen oxides ($NO_x$) that must be at least partially removed. The combustion gases are used to heat water in heat exchanger array 22 before the combustion gases are exhausted to the atmosphere by passage 23 and apparatus downstream. A mixing device 24 is optional following adding urea reagent to a side stream and combining the side stream with a main combustion gas stream as will be explained. The term "side stream" is used herein to refer to a stream of relatively small volume relative to the total volume of combustion gases to be treated by gasified urea and $NO_x$-reduction catalysts, 26, 26' and 26". The side stream can be obtained by splitting off a side stream portion 28 of the full stream of combustion gases in passage 23 leaving principal stream 29 of combustion gases. The separation in various embodiments will be made before or after treatment. In addition, the side stream can be formed by drawing in a stream of air from sources external of the combustor.

Catalysts 26, 26' and 26" are employed in an array forming a reactor and are SCR catalysts as known in the art for reducing $NO_x$ utilizing ammonia or urea in various hydrolyzed, gasified, pyrolyzed and like forms. Among the suitable SCR catalysts are those capable of reducing the effluent nitrogen oxides concentration in the presence of ammonia. These include, for instance, activated carbon, charcoal or coke, zeolites, vanadium oxide, tungsten oxide, titanium oxide, iron oxide, copper oxide, manganese oxide, chromium oxide, noble metals such as platinum group metals like platinum, palladium, rhodium, and iridium, or mixtures of these. Other SCR catalyst materials conventional in the art and familiar to the skilled artisan can also be utilized. These SCR catalyst materials are typically mounted on a support such as a metal, ceramic, zeolite, or homogeneous monolith, although other art-known supports can also be used.

Among the useful SCR catalysts are those representative prior art processes described below. Selective catalytic reduction processes for reducing $NO_x$ are well known and utilize a variety of catalytic agents. For instance, in European Patent Application WO 210,392, Eichholtz and Weiler discuss the catalytic removal of nitrogen oxides using activated charcoal or activated coke, with the addition of ammonia, as a catalyst. Kato, et al., in U.S. Pat. No. 4,138,469 and Henke in U.S. Pat. No. 4,393,031 disclose the catalytic reduction of $NO_x$ using platinum group metals and/or other metals such as titanium, copper, molybdenum, vanadium, tungsten, or oxides thereof with the addition of ammonia to achieve the desired catalytic reduction. See also EP 487,886, which specifies a $V_2O_5/WO_3/TiO_2$ catalyst with a working range of 220° to 280° C. Other catalysts based on platinum can have operating temperatures even lower, e.g., down to about 180° C.

Another catalytic reduction process is disclosed by Canadian Patent 1,100,292 to Knight, which relates to the use of a platinum group metal, gold, and/or silver catalyst deposited on a refractory oxide. Mori, et al., in U.S. Pat. No. 4,107,272, discuss the catalytic reduction of $NO_x$ using oxysulfur, sulfate, or sulfite compounds of vanadium, chromium, manganese, iron, copper, and nickel with the addition of ammonia gas.

In a multi-phased catalytic system, Ginger, in U.S. Pat. No. 4,268,488, discloses exposing a nitrogen oxides containing effluent to a first catalyst comprising a copper compound such as copper sulfate and a second catalyst comprising metal combinations such as sulfates of vanadium and iron or tungsten and iron on a carrier in the presence of ammonia.

The effluent containing the reactant gas is most preferably passed over the SCR catalyst while the combustion gases including the gasified urea or other reagent are at a temperature of at least about 100° C. and typically between about 180° and about 650° C., preferably above at least about 250° C. In this manner, the active species present in the effluent due to gasification of the reagent solution most effectively facilitate the catalytic reduction of nitrogen oxides and condensation of water is controlled. The effluent will typically contain an excess of oxygen, e.g., up to about 15% of that required to fully oxidize the carbonaceous fuel. Use of the present invention with any of the above SCR catalysts (the disclosure of which are specifically incorporated by reference) reduces or eliminates the requirement for the transport, storage and handling of large amounts of ammonia or ammonium water.

In FIG. 1, the main full stream of combustion gases in duct 23 is split to provide side stream 28 and a principal stream 29 of volume greater than the side stream. Urea, which decomposes at temperatures above 140° C., is injected from storage 30 via nozzle 32 with suitable valves 34 and controllers (not shown) into a flue gas stream 28 split off after a primary superheater or an economizer (shown generally as heat exchanger 22). To achieve the goal of gasification for a urea or a urea-related $NO_x$-reducing reagent, temperatures above about 300° C. are typically employed for gasification.

The urea solution is desirably maintained at a concentration suitable for storage and handling without precipitation or other problem. Concentrations of from about 5 to 70% can be employed with some degree of practicality, but concentrations of from about 15 to about 50% are more typical. It is an advantage of the invention that the amount of water in the urea solution can be varied alone or with steam added to suitably control the temperature of the gases in the side stream.

The temperature of the gases produced by gasifying reagents in this group should be maintained at a level that prevents their condensation. Typically, the temperature should be maintained at a temperature at least about 150° C., and preferably at least 200° C. A preferred temperature range for the gasification and for transfer of the gases produced by the noted group of reagents, is from about 300° to about 650° C. Ideally, the side stream 28 would decompose the urea into active species without need for further heating. This side stream (e.g., from 0.1 to 25% of the flue gas), typically less than 10% and usually less than 3%, e.g., from 0.1 to 2%, of the volume of the total combustion gases (flue gas), provides the required enthalpy for complete decomposition of urea and the sufficient momentum to mix the side stream 28 with the principal stream 29 while the principal stream 29 can be utilized for further heat exchange.

The vessel carrying the side stream 28 provides the required time and gas velocity for urea decomposition. After injection, a residence time from 1 to 10 seconds is typically provided to completely decompose urea and promote the reaction between HNCO and water vapor to form ammonia. Side stream gas velocity of 1 to 20 feet per second is maintained throughout the vessel to optimize vessel dimensions, achieve plug flow, enhance the urea droplet dispersion, evaporation, and decomposition into the side stream, and minimize droplet impingement on vessel walls. Internal channels and multiwalls may be preferred to achieve the optimum gas velocity and to minimize heat loss to outside environment. The optimum vessel design can be derived by using, among others, well-established design tools such as computational fluid-dynamics model.

The urea injection nozzle 32 introduces well-defined droplets. Both air assisted atomizer or a mechanical atomizer can be utilized. Droplet sizes less than 500 microns but typically less than 100 and preferably below 50 microns are desirable to rapidly evaporate and decompose urea droplets. Also in consideration of vessel size, small and slow droplets generated from, e.g., ultrasonic nozzles can be more desirable than large and fast droplets. If desired, steam can be introduced as necessary or desired. (See FIGS. 7–9, in this regard.) This side stream 28 can then be directed to an injection grid 37 (or other suitable introduction device or apparatus such as a traditional ammonia injection grid) ahead of SCR reactor containing catalysts, e.g., 26, 26' and 26". In this embodiment, a high temperature blower 36 is employed to provide a suitable injection pressure, e.g., about 1 psig or less, for the ammonia injection grid 37 and additionally provides mixing. Alternatively, a high temperature blower 36 can be located upstream of urea nozzle 32 instead of the depicted location.

A traditional ammonia injection grid 37 with densely located nozzles requires as low as 0.1% of the total combustor flue gas as the side stream. A static mixer 24 can be used if desired. Alternatively, injection grid 37 can comprise fewer and sparsely-placed nozzles or openings with a static mixer 24 located downstream to obtain a uniform distribution. This alternate design may reduce cost and maintenance associated with the injection grid. The mixing with the flue gas is facilitated due to an order of magnitude higher mass of side stream, e.g., 1 to 2% of the flue gas, compared to that injected through an ammonia injection grid (AIG) in a traditional ammonia SCR process. Thus, the current embodiment provides the flexibility to the type of injection grid depending on the application requirements.

It is an advantage of this and other embodiments of the invention that because relatively large volumes of side stream gases are mixed with the urea solution prior to introducing the gases into the SCR catalyst, an overt mixing procedure is not essential. It will be advantageous in many cases, especially where there is a high degree of fluctuation in gas volumes, to provide means for mixing the gases at one or more stages. Among the suitable mixing means are static mixers, cyclones, blowers and other process equipment that by design or effect mixes the gases.

It is another advantage of this embodiment of the invention that by utilizing the side stream comprised of combustion gases prior to full heat exchange, the enthalpy of the gases is utilized for gasification by direct heat exchange with the aqueous urea solution. Surprisingly, calculations will show that direct heat exchange in this manner using supplementary heat only as needed under low-load conditions—when the need for $NO_x$ reduction is also low—will be much more efficient than employing supplementary heat in a cold stream to gasify urea. Advantageously, also, the addition of supplemental heat to the side stream can be an effective means to control the temperature in the side stream for consistent urea decomposition and SCR catalyst and maintain both temperatures within its effective temperature range.

Figure 2:
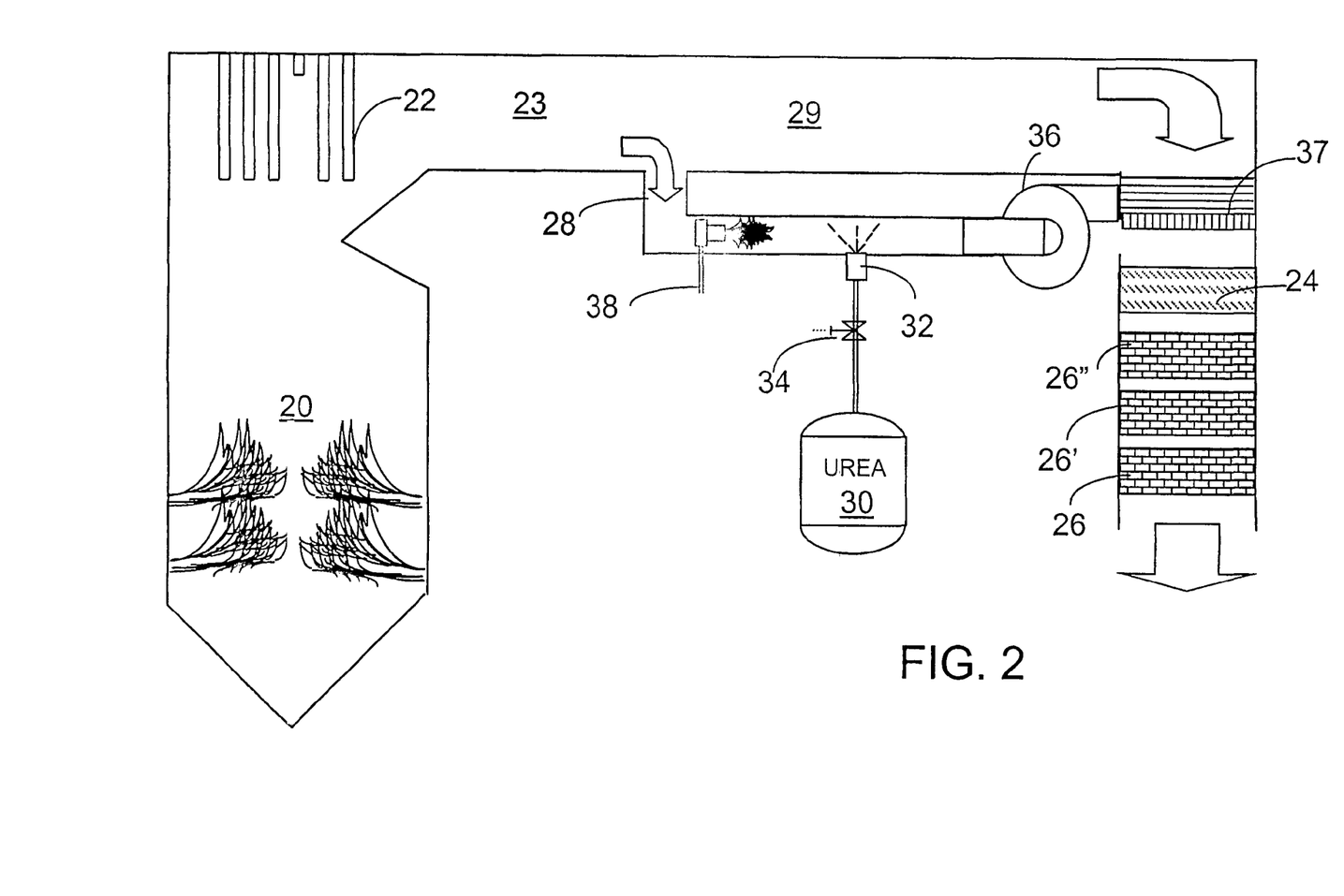
FIG. 2 is a schematic representation of another embodiment of the invention wherein a side stream is separated from the main effluent stream from a combustor and a burner or other means of heating the flue gas is provided to raise the split stream temperature sufficiently to fully decompose the urea to active gas species and urea is injected into it wherein it is decomposed or otherwise gasified.

FIG. 2 illustrates an embodiment similar to that of FIG. 1, but provides heater 38 to enable increasing the temperature of the side stream 28 sufficiently to assure breakdown of the urea as needed. This is especially useful when output is low for a boiler. It is an advantage of this arrangement that when heat is required, the amount required is far less than would be needed to heat either the entire effluent or simply the urea. A high temperature blower 36, located downstream of urea nozzle 32, can be located upstream of heater 38 instead of the depicted location. A heater 38 shown as a burner can be replaced with a steam coil heater, heat exchanger or other means to transfer heat to the side stream 28.

Figure 3:
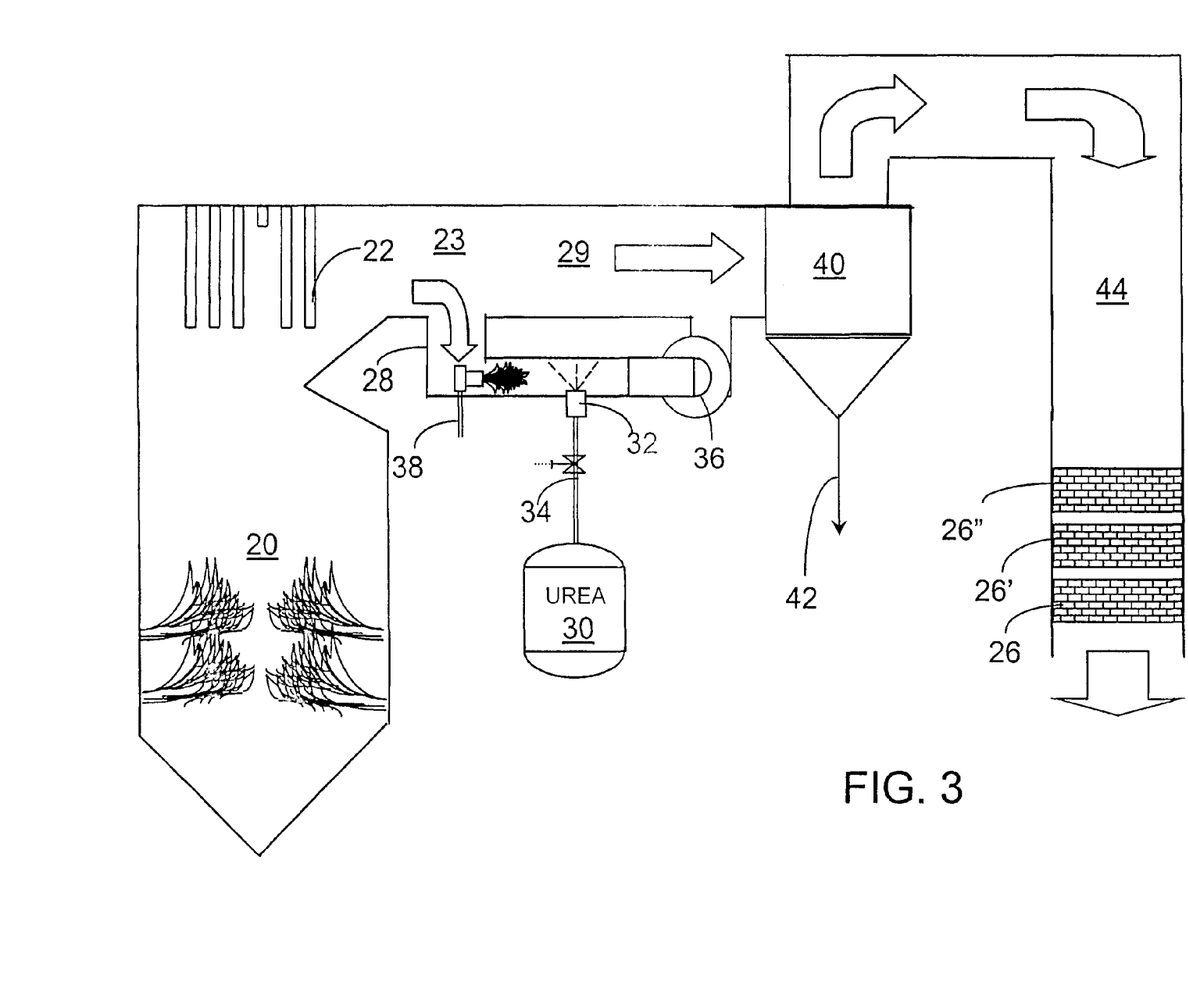
FIG. 3 is a schematic representation of another embodiment of the invention wherein a side stream is separated from the main effluent stream from a combustor and urea is injected into it, and is optionally heated, with the two streams then combined and passed through a cyclone to effect complete mixing and particle separation.

FIG. 3 is a schematic representation of another embodiment of the invention wherein side stream 28 is separated from the main effluent stream from a combustor and heated as needed prior to injecting urea into it. The two streams (23 and 28) are combined and passed through a cyclone 40 to effect particle separation and complete mixing. A high temperature blower 36, located downstream of urea nozzle 32, can be located upstream of heater 38. A heater 38 can be replaced with a steam coil heater, heat exchanger or other means to transfer heat to the side stream 28.

Figure 4:
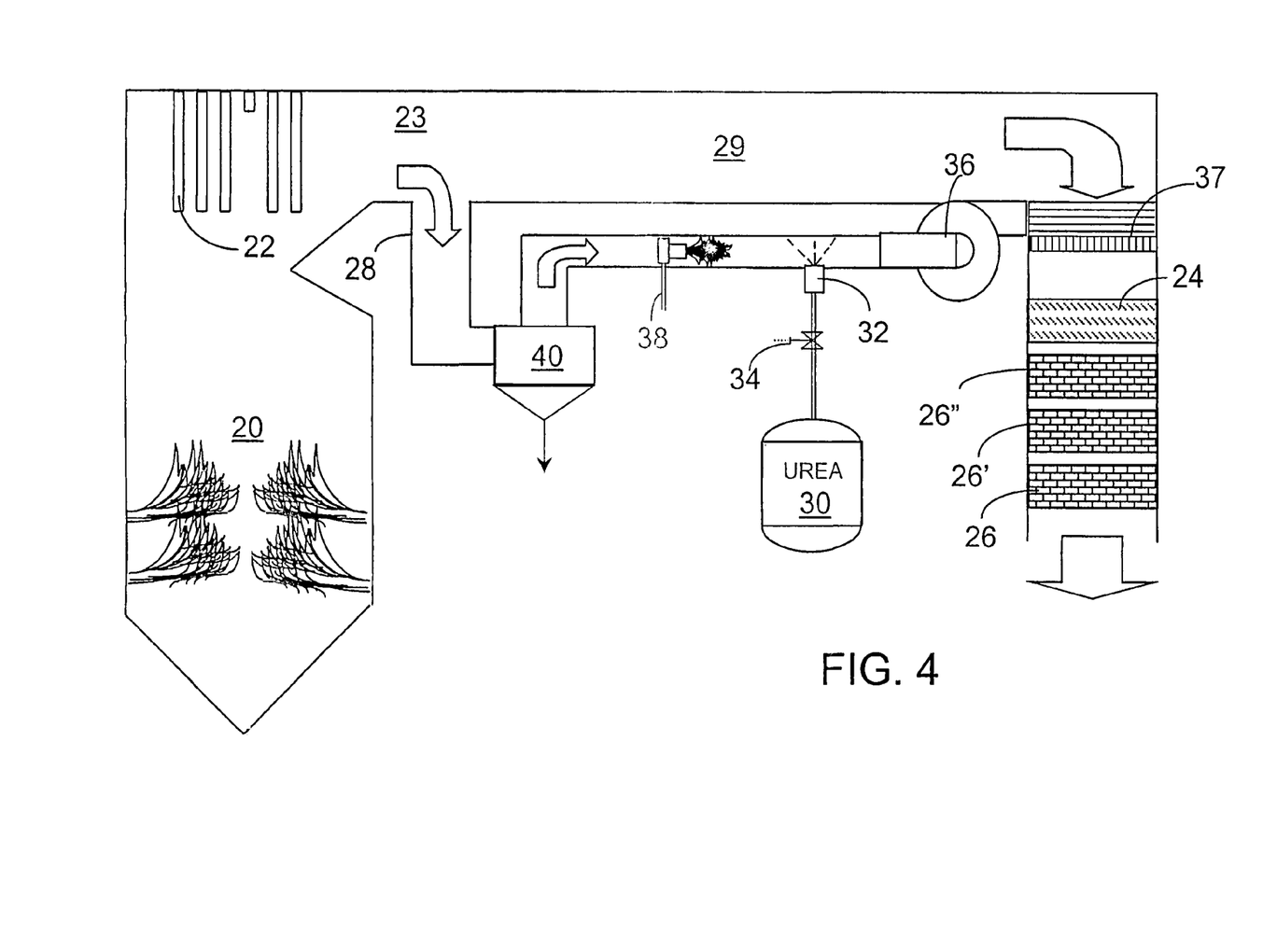
FIG. 4 is a schematic representation of another embodiment of the invention wherein a side stream is separated from the main effluent stream from a combustor and is passed through a cyclone prior to heating and injecting urea into it, with the side stream advanced through an injection grid with the aid of a blower.

FIG. 4 is a schematic representation of another embodiment of the invention wherein side stream 28 is separated from the main effluent stream 23 from combustor 20 and is passed through a cyclone 40 (or other particle separating device or apparatus) prior to heating as needed by heater 38 and injecting urea into it via injector 32. A high temperature blower 36, located downstream of urea nozzle 32, can be located upstream of heater 38 or a cyclone separator 40. A heater 38 can be replaced with a steam coil heater, heat exchanger or other means to transfer heat to the side stream 28.

Figure 5:
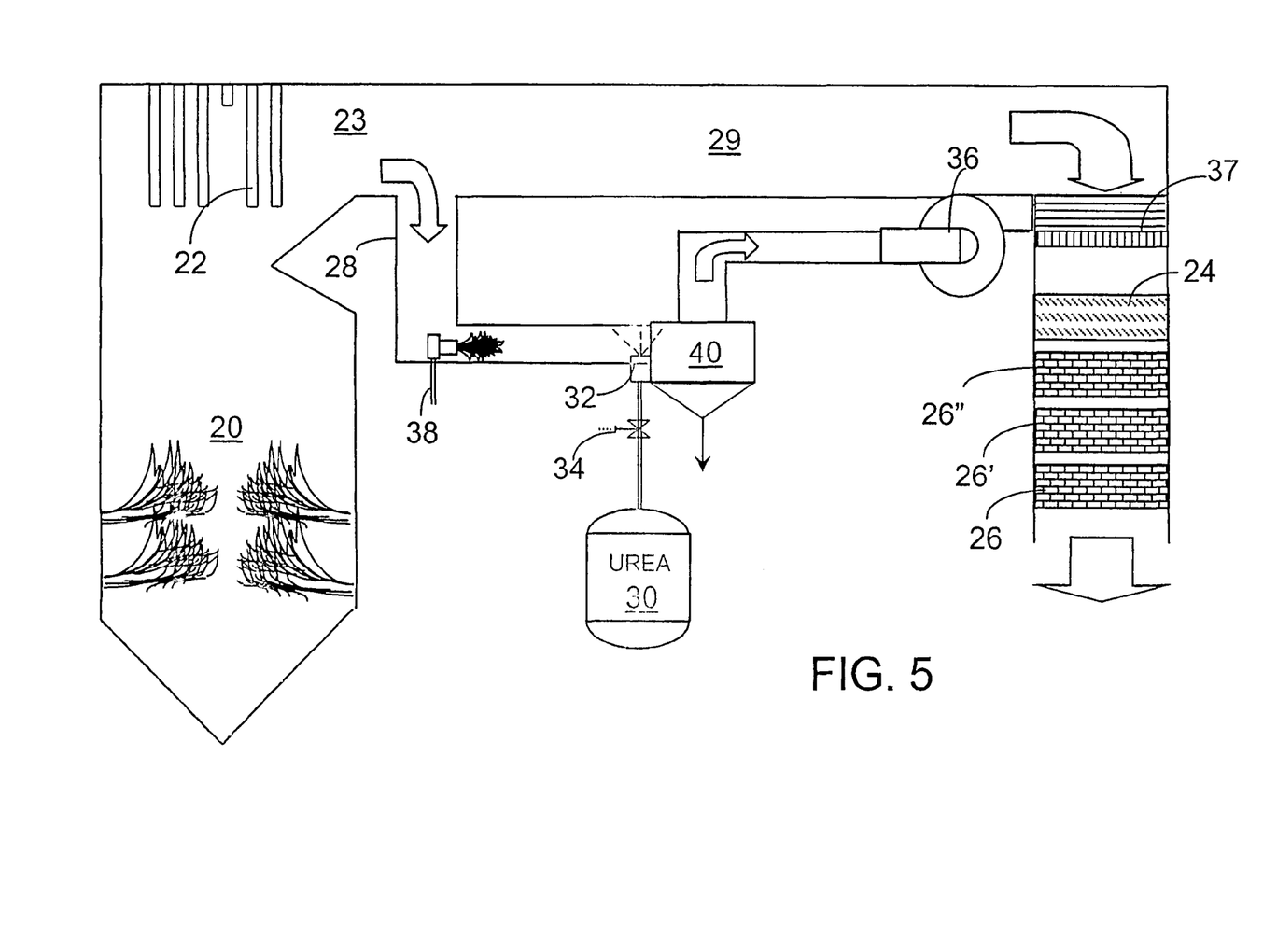
FIG. 5 is a schematic representation of another embodiment of the invention wherein a side stream is separated from the main effluent stream from a combustor and the stream is heated and injected with urea prior to passing it through a cyclone.

FIG. 5 is a schematic representation of an embodiment of the invention similar to that in FIG. 4, wherein side stream 28 is separated from the main effluent stream 23 from a combustor 22 is heated and urea is injected into it just prior to or in cyclone 40 (or other particle separating device or apparatus). The resulting treated stream is passed via blower 36 though an injection grid 37 (or other suitable introduction device or apparatus) ahead of the SCR reactor. Also, an optional static mixer 39 is illustrated. A high temperature blower 36, located downstream of cyclone 40, can be located upstream of heater 38. A heater 38 can be replaced with a steam coil heater, heat exchanger or other means to transfer heat to the side stream 28.

Figure 6:
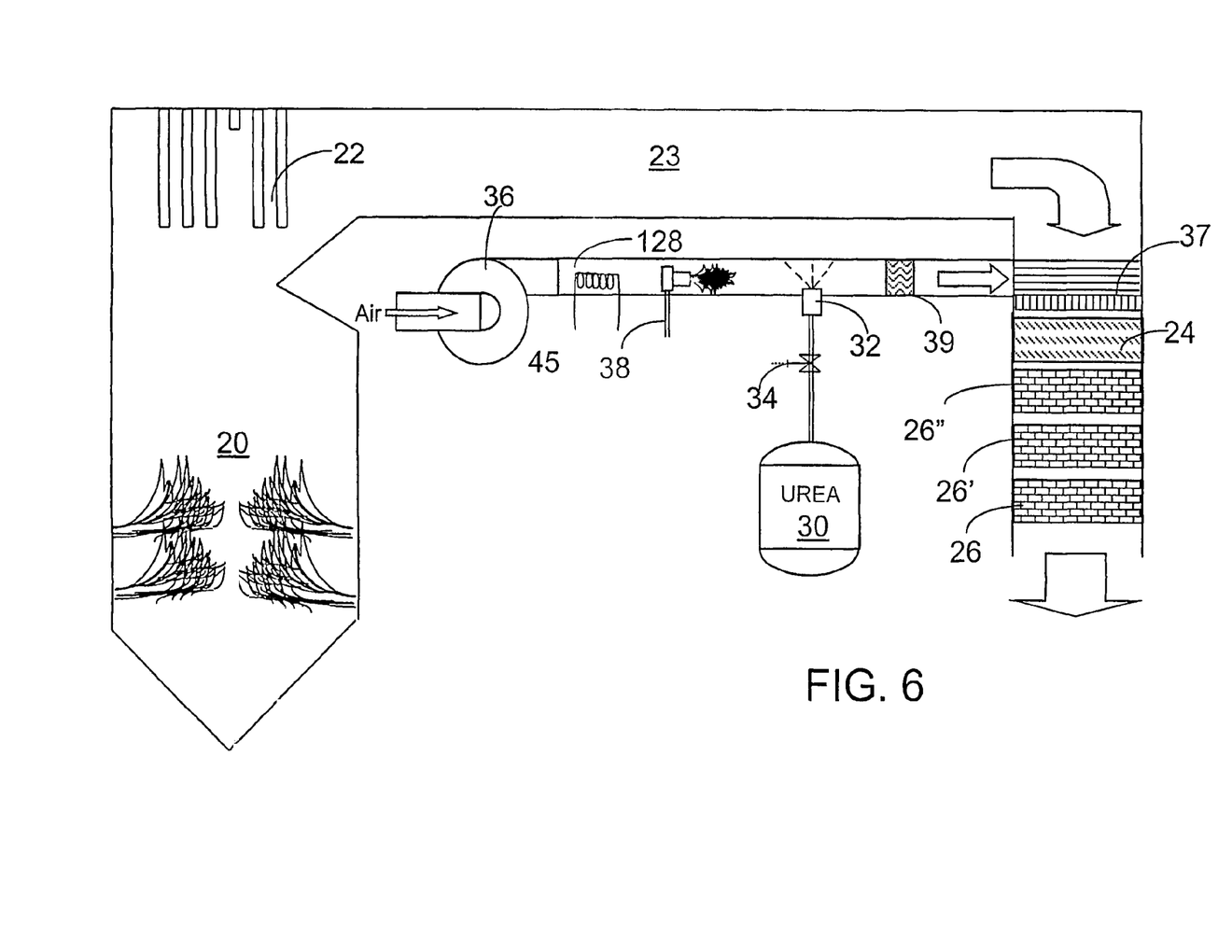
FIG. 6 is a schematic representation of another embodiment of the invention wherein a stream of air is heated and urea is injected into it, with the resulting stream being then passed through a mixer, if desirable, and injection grid and combined with the effluent stream from a combustor and passed through an SCR reactor.

FIG. 6 is a schematic representation of another embodiment of the invention wherein a stream of air is forced into duct 128 and heated, and urea is injected into it via injector 32. The resulting stream is then passed through a mixer and injection grid as it is combined with the effluent stream from a combustor and passed through an SCR reactor. This embodiment shows heat exchanger 45 and burner 38, but either or both can be employed as needed. Other means to transfer heat to the side stream 28 can replace the heat exchanger 45 or a burner 38.

This embodiment is useful in situations where the configuration of combustor 20 does not easily permit construction of a side stream of combustion gases and, therefore, requires additional heat. This additional heat can be lessened by using the preheated combustion air commonly available in utility boilers.

Figure 7:
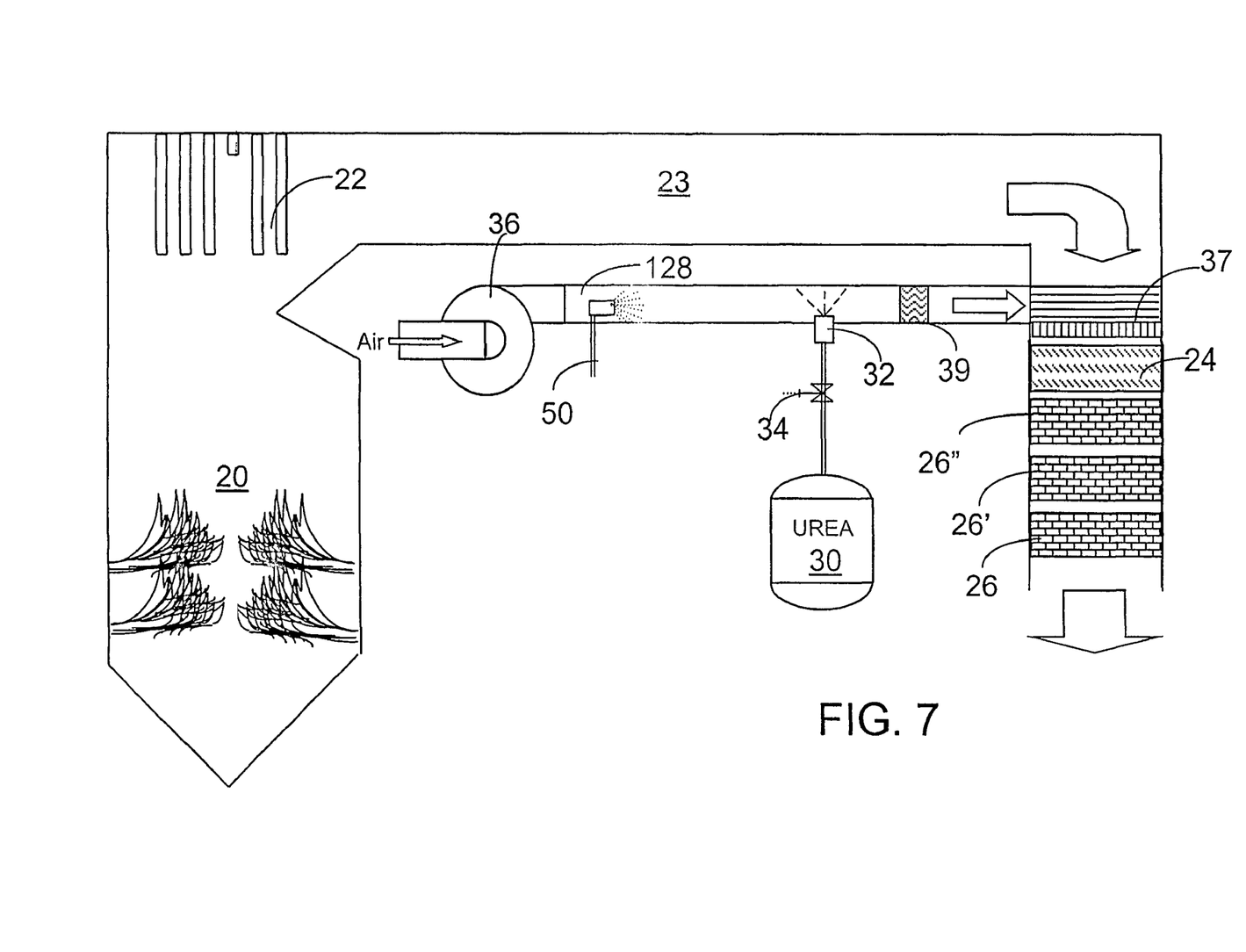
FIG. 7 is a schematic representation of another embodiment of the invention similar to FIG. 6, wherein steam is employed as the heat source.

FIG. 7 is a schematic representation of another embodiment of the invention similar to FIG. 6, wherein steam is introduced by means 50 as the heat source.

Figure 8:
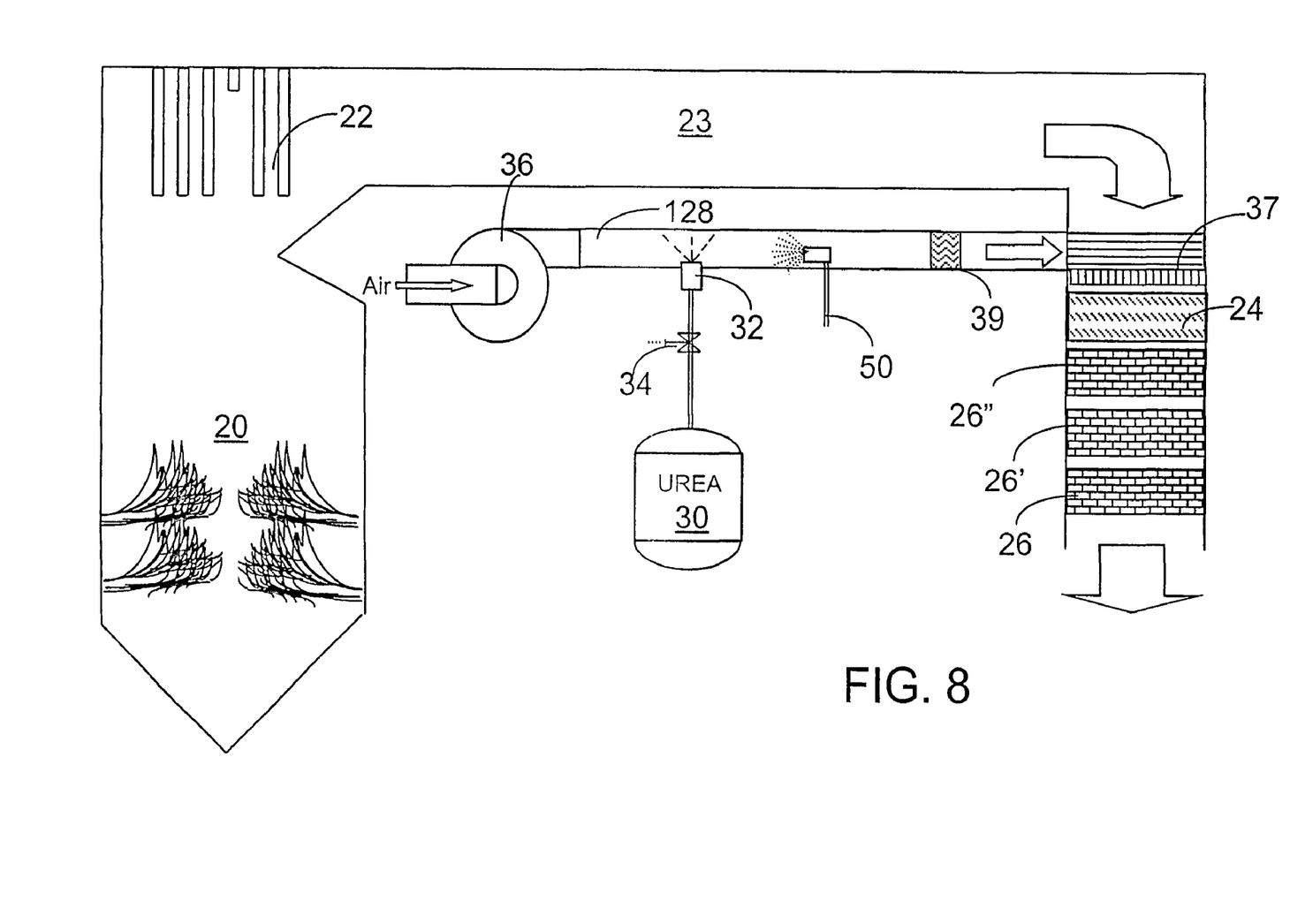
FIG. 8 is a schematic representation of another embodiment of the invention similar to FIG. 7, wherein the steam is introduced following introduction of the urea.

FIG. 8 is a schematic representation of another embodiment of the invention similar to FIG. 7, wherein the steam source 50 is located following introduction of the urea.

Figure 9:
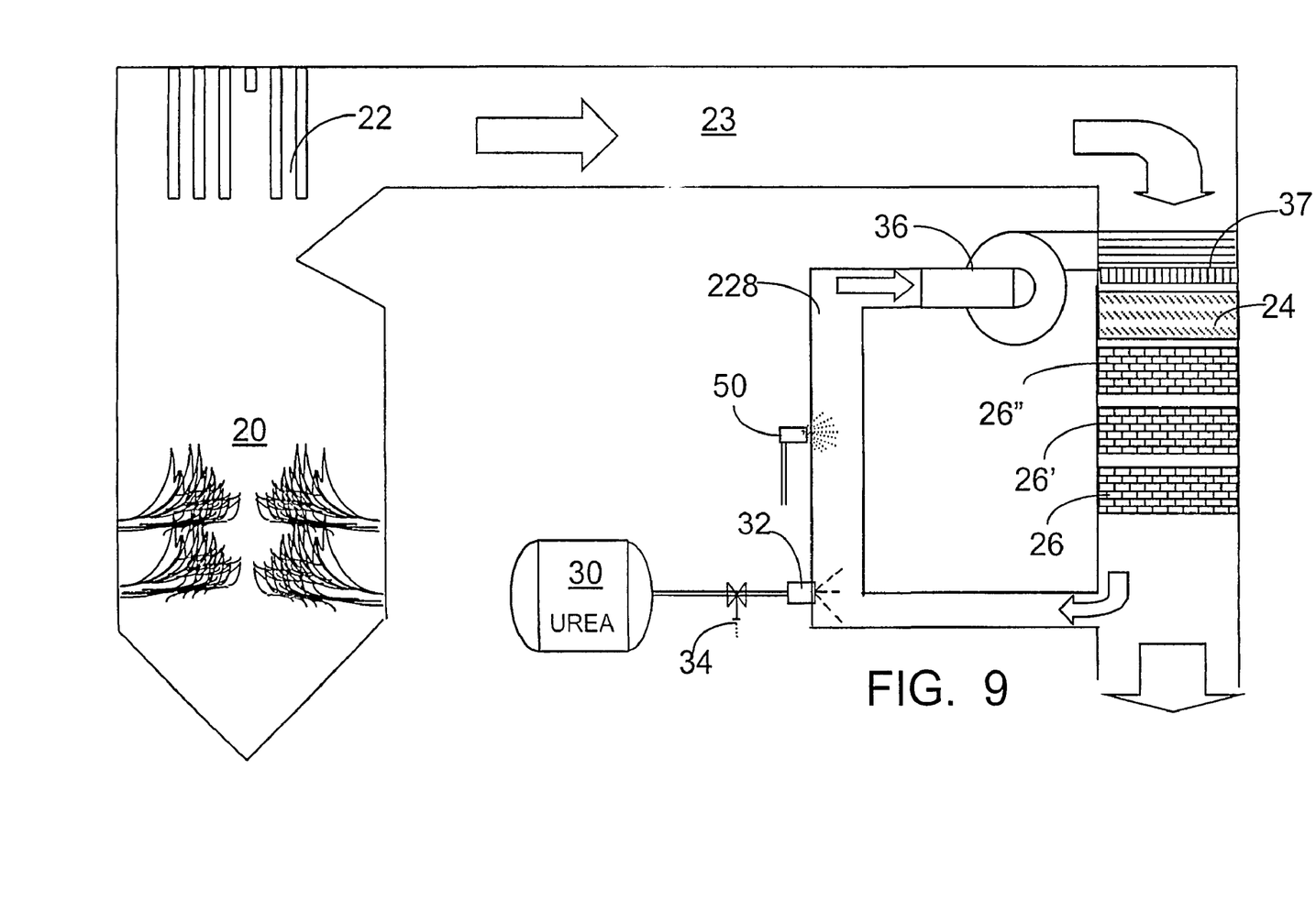
FIG. 9 is a schematic representation of another embodiment of the invention wherein the side stream is formed from combustion gases following treatment in the SCR reactor, with the resulting stream being heated and injected with urea.

FIG. 9 is a schematic representation of another embodiment of the invention similar to FIG. 6, wherein a side stream 228 is formed from combustion gases following treatment in the SCR catalyst reactor. This embodiment has the advantage that the gases have considerable heat value, especially if withdrawn prior to using them to preheat the combustion air.

Figure 10:
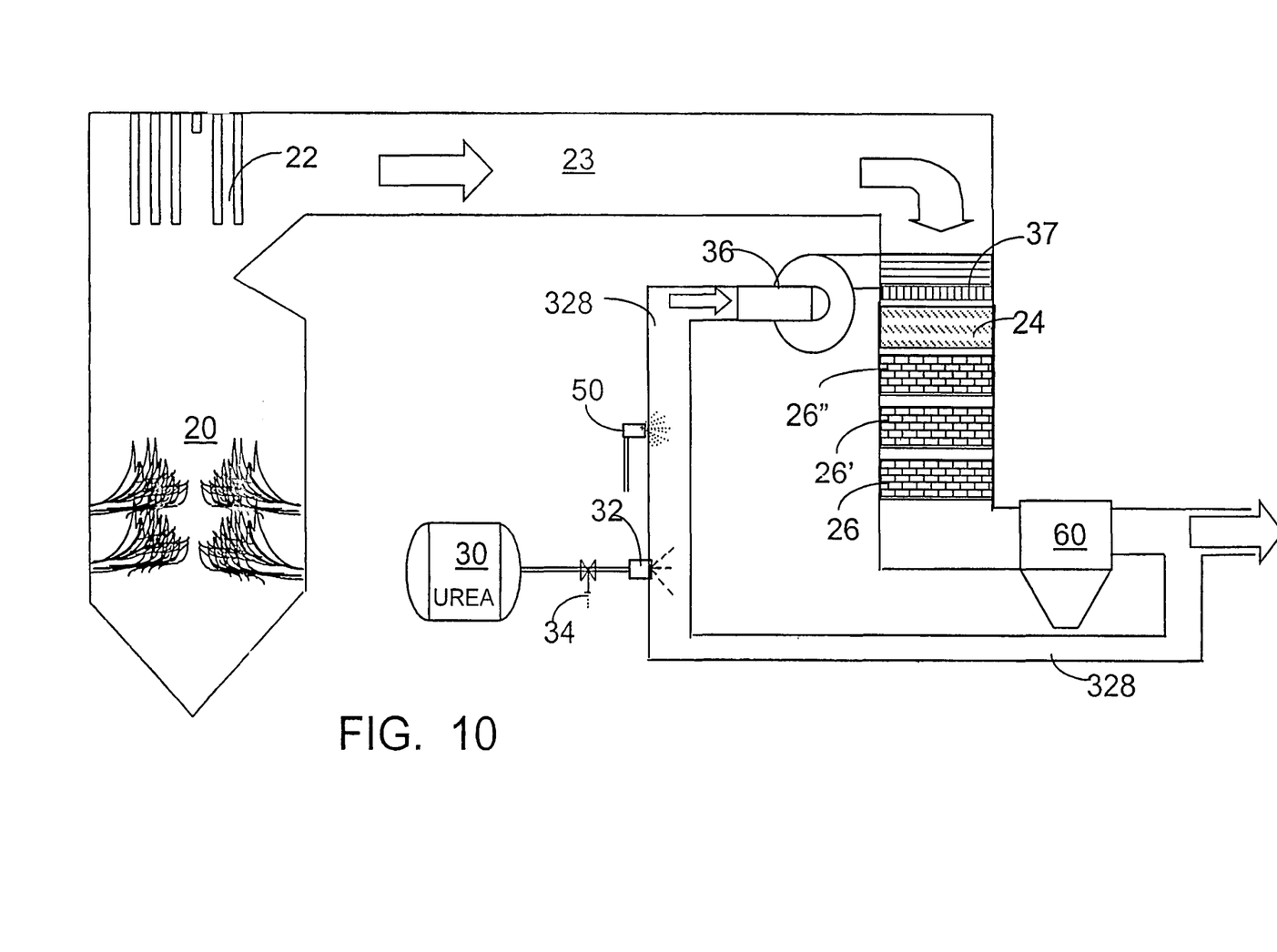
FIG. 10 is a schematic representation of another embodiment of the invention wherein the side stream is formed from combustion gases following treatment in the SCR reactor and a particulate collection device such as ESP, bag filter, or cyclonic separators, with the resulting stream being heated and injected with urea.

FIG. 10 is a schematic representation of another embodiment of the invention similar to FIG. 9, wherein a side stream 328 is formed from combustion gases following treatment in the SCR catalyst reactor and downstream particulate collection device 60 such as an electrostatic precipitator, bag filter, or a cyclonic separator. While gases have less heat value than the previous representation, this scheme offers an advantage of being substantially particulate free when applied on solid or liquid fired combustors. Low particulates minimize maintenance requirements.

Figure 11:
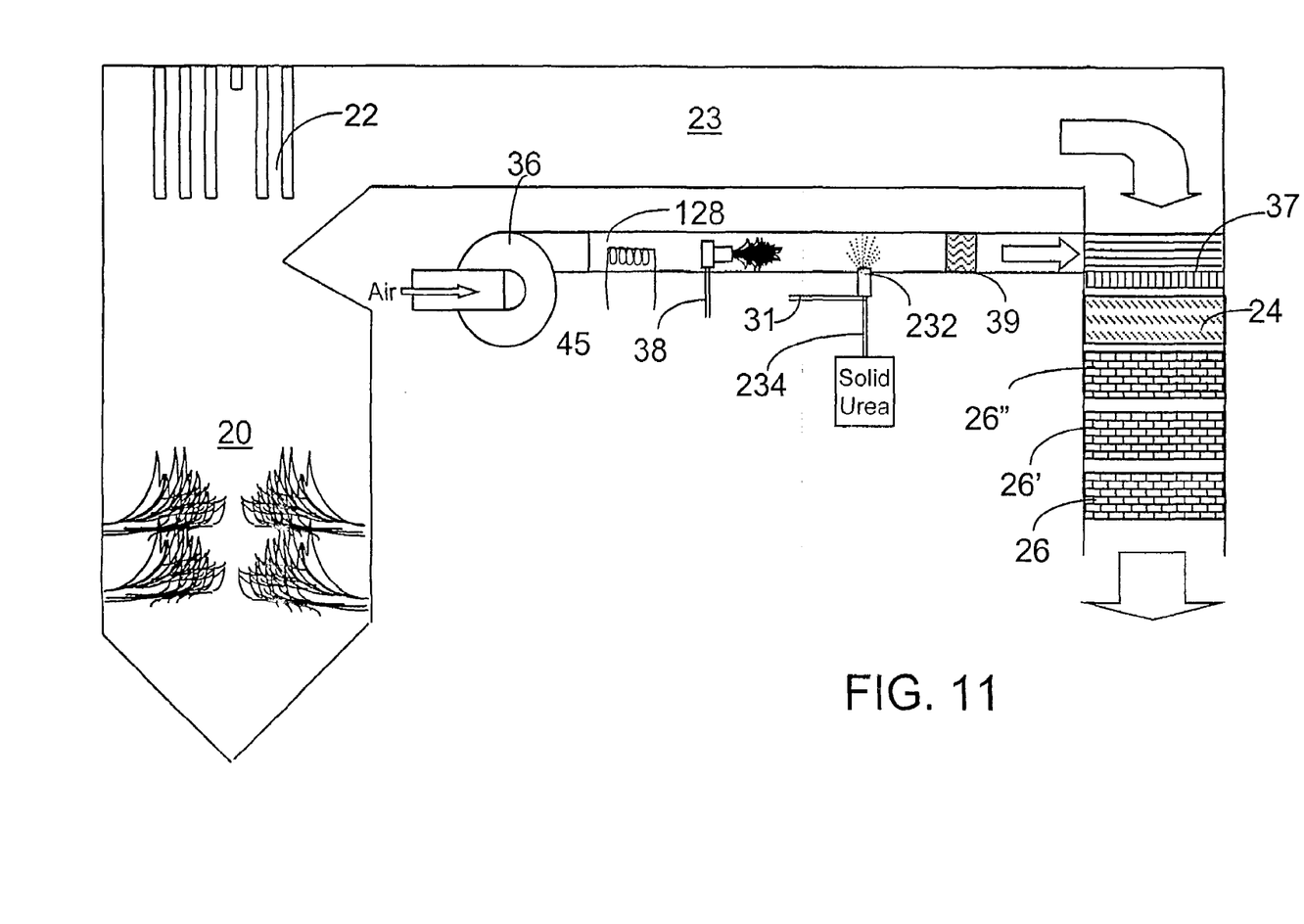
FIG. 11 is a modification of urea injection from FIG. 6, wherein instead of aqueous urea injection, a finely ground, pulverized or micronized solid urea is injected using pneumatic carrier air.

In FIG 11, a modification of urea injection from FIG. 6 is represented. Instead of aqueous urea injection, a finely ground, pulverized or micronized solid urea is injected using pneumatic carrier air via line 31 and nozzle 232 from line 234. This solid urea injection can be adapted into all previous representations. Without water, solid urea has the advantage of lower heating requirements.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. A process for reducing the concentration of nitrogen oxides in a stream of combustion gases from a large-scale, stationary combustor, comprising: providing a flowing side stream of gases comprised of outside air and/or combustion gases and comprising less than 3% of the volume of the total combustion gases at a temperature sufficient for gasification without use of a catalyst in a residence time of from 1 to 10 seconds; introducing an aqueous solution of urea into said flowing side stream under conditions effective to gasify said aqueous urea; introducing said side stream of gases containing the gases resulting from the gasification of the urea into a primary stream of $NO_x$-containing gases of greater volume than the side stream to create a combined gas stream; and passing the combined gas stream through a $NO_x$-reducing catalyst under conditions effective to reduce the concentration of $NO_x$ in the combined gas stream.

2. A process according to claim 1, wherein the side stream comprises combustion gases separated from a combustion gas stream to produce said side stream, which is moving at a velocity of from 1 to 20 feet per second, and said primary stream, and said side stream is heated to a temperature of from 300° C. to 650° C., and the urea is sprayed into the side stream at droplet sizes of less than 500 microns.

3. A process according to claim 1, wherein the side stream is moving at a velocity of from 1 to 20 feet per second and comprises outside air which is heated to a temperature of from 300° C. to 650° C., and the urea is strayed Into the side stream at droplet sizes of less than 500 microns.

4. A process according to claim 1, wherein the side stream comprises gases withdrawn from said combined gas stream following their passage through said $NO_x$-reducing catalyst, is moving at a velocity of from 1 to 20 feet per second is heated to a temperature of from 300° C. to 650° C., and the urea is sprayed into the side stream at droplet sizes of less than 500 microns.

5. A process according to any one of claims 1–4, wherein the urea solution is introduced at a rate relative to the $NO_x$ concentration in said combined stream prior to passage through said $NO_x$-reducing catalyst effective to provide an NSR of from 0.1 to 2.0.

6. A process according to any one of claims 1–4, wherein the aqueous urea has a concentration of from 5 to 70%.

7. A process according to any one of claims 1–4, wherein the side stream is heated by the use of steam to facilitate gasification of the urea.

8. A process according to any one of claims 1–4, wherein the side stream is passed through a mixing device prior to introducing said side stream of gases containing the gases resulting from the gasification of the urea into said primary stream of $NO_x$-containing gases to create said combined gas stream.

9. A process according to any one of claims 1–4, wherein urea is introduced into the side stream following passage of the gases therein through particulate reduction means.

10. A process for reducing the concentration of nitrogen oxides in a stream of combustion gases from a large-scale, stationary combustor, comprising: providing a side stream of gases comprising less than 3% of the volume of the total combustion gases at a temperature sufficient for gasification without use of a catalyst in a residence time of from 1 to 10 seconds; introducing solid urea into said side stream under conditions effective to gasify said aqueous urea; introducing said side stream of gases containing the gases resulting from the gasification of the urea into a primary stream of $NO_x$-containing gases of greater volume than the side stream to create a combined gas stream; and passing the combined gas stream through a $NO_x$-reducing catalyst under conditions effective to reduce the concentration of $NO_x$ in the combined gas stream.

11. A process according to any one of claims 1–4, wherein said side steam of gases is heated to a temperature of at least 200° C. prior to introducing the aqueous solution of urea having a concentration of from 5 to 70% at a rate relative to the $NO_x$ concentration in said combined stream prior to passage through said $NO_x$-reducing catalyst effective to provide an NSR of from 0.1 to 2.0, and the side stream is passed through a mixing device prior to introducing said side stream of gases containing the gases resulting from the gasification of the urea into said primary stream of $NO_x$-containing gases to create said combined gas stream.

12. A process according to any one of claims 1–4, wherein said side stream of gases comprises less than 2% of the volume of the combined gas stream under standard conditions.

13. A process for reducing the concentration of nitrogen oxides in a stream of combustion gases from a large-scale, stationary combustor comprising: providing a flowing side stream of gases comprising less than 3% of the volume of the total combustion gases at a temperature sufficient for gasification without use of a catalyst in a residence time of from 1 to 10 seconds, said side stream comprising combustion gases separated from a combustion gas stream to produce said side stream and a primary stream, wherein said side stream of gases comprises less than 10% of the volume of the combustion gases under standard conditions; introducing an aqueous solution of urea into said side stream under conditions effective to gasify said aqueous urea, said urea having a concentration of from 5 to 70% and is introduced at a rate relative to the $NO_x$ concentration in said combined stream prior to passage through said $NO_x$ reducing catalyst effective to provide an NSR of from 0.1 to 2.0; introducing said side sateen of gases containing the gases resulting from the gasification of the urea into said primary steam of $NO_x$-containing gases of greater volume than the side stream to create a combined gas stream; and passing the combined gas stream through a $NO_x$-reducing catalyst under conditions effective to reduce the concentration of $NO_x$ in the combined gas stream.

14. A process for reducing the concentration of nitrogen oxides in a stream of combustion gases from a lane-scale, stationary combustor, comprising: providing a flowing side stream of gases comprising less than 3% of the volume of the total combustion gases at a temperature sufficient for gasification without use of a catalyst in a residence time of from 1 to 10 seconds, said side stream comprising combustion gases separated from a combustion gas stream to produce said side steam and a primary stream, wherein said side stream of gases comprises less than 10% of the volume of the combustion gases under standard conditions; introducing an aqueous solution of urea into said side stream under conditions effective to gasify said aqueous urea, said urea having a concentration of from 5 to 70% and is introduced at a rate relative to the $NO_x$ concentration in said combined stream prior to passage through said $NO_x$-reducing catalyst effective to provide an NSR of from 0.1 to 2.0; introducing said side stream of gases containing the gases resulting from the gasification of the urea into said primary stream of $NO_x$-containing gases of greater volume than the side stream to create a combined gas stream; and passing the combined gas stream through a $NO_x$-reducing catalyst under conditions effective to reduce the concentration of $NO_x$ in the combined gas stream; wherein said combustion gases comprised in said side stream are separated from said combined gas stream following passage through the $NO_x$-reducing catalyst.

15. A process for reducing the concentration of nitrogen oxides in a stream of combustion gases from a large-scale, stationary combustor, comprising: providing a flowing side stream of gases comprising less than 3% of the volume of the total combustion gases at a temperature sufficient for gasification without use of a catalyst in a residence time of from 1 to 10 seconds, wherein said side stream of gases comprises less than 10% of the volume of the combustion gases under standard conditions and are supplied from a source external of the combustion gases; introducing an aqueous solution of urea into said side stream under conditions effective to gasify said aqueous urea, said urea having a concentration of from 15 to 70% and is introduced at a rate relative to the NOx concentration in said combined stream prior to passage through said $NO_x$-reducing catalyst effective to provide an NSR of from 0.1 to 2.0; introducing said side stream of gases containing the gases resulting from the gasification of the urea into said primary stream of $NO_x$-containing gases of greater volume than the side stream to create a combined gas stream; and passing the combined gas stream through a $NO_x$-reducing catalyst under conditions effective to reduce the concentration of $NO_x$ in the combined gas stream.

* * * * *